United States Patent Office 3,435,111
Patented Mar. 25, 1969

3,435,111
PROCESS FOR DARKENING SKIN USING A
GLYCERALDEHYDE COMPOSITION
Eldridge Myles Glenn, Kalamazoo, Mich., assignor to
The Upjohn Company, Kalamazoo, Mich., a corporation of Delaware
No Drawing. Continuation-in-part of application Ser. No. 472,692, July 16, 1965. This application July 10, 1967, Ser. No. 652,014
Int. Cl. A61l 23/00
U.S. Cl. 424—59    4 Claims

ABSTRACT OF THE DISCLOSURE

A method for darkening skin and rendering skin less permeable to ultraviolet radiation for cosmetic reasons to prevent sunburn by application of glyceraldehyde in association with a pharmaceutically acceptable carrier having a pH greater than 7 to noninflamed skin.

CROSS REFERENCE TO RELATED APPLICATION

This application is a continuation-in-part of application Ser. No. 472,692, filed July 16, 1965 now abandoned.

Reference is made to U.S. Patent 3,162,576, patented Dec. 22, 1964, which teaches the use of glyceraldehyde containing compositions for treating inflammation by the application of said composition to inflamed tissues.

BRIEF SUMMARY OF INVENTION

This invention relates to a cosmetic method of darkening the skin to simulate a natural "tan" and a method of prophylactic treatment for preventing sunburn by rendering the skin less permeable to ultraviolet radiation comprising the application of glyceraldehyde in association with a pharmaceutically acceptable carrier having a pH greater than 7 to noninflamed skin.

DETAILED DESCRIPTION

The compositions are considered "tanning" compositions and can be used for cosmetic reasons to darken the skin and given an appearance similar to the natural tanning following exposure to the sun. The compositions are further useful prophylactically to prevent sunburn by rendering noninflamed skin less permeable to the ultraviolet rays which cause sunburn. The compositions of the present invention have the unique and unexpected property of providing a slower and more uniform darkening action on the skin. This unexpected property is desirable from both the cosmetic and prophylactic viewpoint.

The compositions of the present invention comprise glyceraldehyde dispersed in a pharmaceutically acceptable topical carrier having a pH greater than 7.

The concentration of glyceraldehyde in the compositions of the present invention can range from about 1 to about 50 percent, from about 5 to about 25 percent being preferred.

Specifically included within the term "glyceraldehyde" are the individual d- and l-isomers and mixtures of such isomers, including racemic mixtures thereof.

An alkaline buffer is added to provide a pH of greater than 7. The preferred pH is from about 7.5 to about 8. The alkaline buffer can be a single compound, e.g., sodium bicarbonate, sodium phosphate, and the like, or a combination such as sodium citrate with sodium hydroxide. The combination of sodium citrate and sodium hydroxide is preferred.

Various other active ingredients can be included in the formulations of the present invention to provide a desirable supplementary effect which, when employed in the treatment of particular conditions, enhances the usefulness of the said primary active ingredients. Thus, the addition of antibiotics and/or steroids, such as neomycin and/or 6α-fluoroprednisolone or 6α-methylprednisolone, provides useful combined theraphy. Vasoconstrictors such as epinephrine or phenylnephrine are likewise useful additions.

The addition of other sunscreen and tanning agents is similarly useful, for example, p-aminobenzoate, anthranilates, salicylates, esters of cinnamic acid and di- and trihydroxycinnamic acid, diphenylbutadiene, stilbene, naphtholsulfonates, coumarin derivatives, quinine salts, quinoline derivations, tannic acid, and hydroquinone can, individually and in combination, be added.

Broadly described, the method for the preparation of pharmaceutically acceptable formulations involves the incorporation of the glyceraldehyde, together with any supplementary active ingredients to be included, into the selected alkaline buffered pharmaceutical carrier, utilizing techniques well known in the art. By "pharmaceutically acceptable carrier" as used herein is meant the vehicle into which the glyceraldehyde and alkaline buffer are incorporated, the said vehicle comprising various pharmaceutically and physiologically suitable additives for the purpose of facilitating the formulation of the said active ingredients into the desired pharmaceutical form. In use, these compositions are applied in a manner appropriate to the specific pharmaceutical form used and locale being treated. Application every 3–4 hours is usually sufficient, although when exposed to conditions favoring the removal of the compositions, e.g., swimming, more frequent application is required.

The term "topical" as employed herein relates to the application of the compositions on the surface of the skin for exertion of local action. Accordingly, such topical compositions include those pharmaceutical forms which are applied externally by direct contact with the surface of the skin. Conventional pharmaceutical forms for this purpose include ointments, lotions, pastes, jellies, solutions for wet dressings, paints, and the like. The term "ointment" embraces formulations (including creams) having oleaginous, absorption, water-soluble and emulsion-type bases as described in Remington's Practice of Pharmacy, 12th ed. (1961), p. 410, Mack Publishing Company.

The following examples illustrate the best mode contemplated by the inventor for carrying out the invention, but these are not to be construed as limiting the scope thereof.

EXAMPLE 1.—CREAM 250 kilograms of a cream are made from the following type and amounts of ingredients:

| | Kg. |
|---|---|
| Spermaceti | 12.5 |
| White mineral oil | 5 |
| Glyceryl monostearate (self-emulsifying) | 30 |
| dl- Glyceraldehyde | 7.5 |
| Aqueous sodium hydroxide solution, 30% | .260 |
| Propylparaben | .375 |
| Methylparaben | .125 |
| Sodium citrate | .450 |
| Water q.s. | 250 |

The spermaceti, mineral oil and glycerylmonostearate are melted together and stirred into a solution of the remaining ingredients dissolved in 180 kg. of water. Additonal sodium hydroxide solution is added, if required, to adjust the pH to 7.5–8, and additional water added to make 250 kg. of oil-in-water cream.

EXAMPLE 2.—LOTION 500 kilograms of a lotion are prepared from the following types and amounts of ingredients:

| | Kg. |
|---|---|
| Spermaceti | 12.5 |
| White mineral oil | 5 |
| Glyceryl monostearate (self-emulsifying) | 30 |
| dl-Glyceraldehyde | 10 |
| Aqueous sodium hydroxide solution, 30% | .260 |
| Propylparaben | .375 |
| Methylparaben | .125 |
| Sodium citrate | .450 |
| Water q.s. | 500 |

The spermaceti, mineral oil and glycerylmonostearate are melted together and stirred into a solution of the remaining ingredients dissolved in 450 kg. of water. Additional sodium hydroxide solution is added, if required, to adjust the pH to 7.5–8, and additional water added to make 500 kg. of oil-in-water lotion.

EXAMPLE 3.—OINTMENT

Five kilograms of an ointment containing 50% dl-glyceraldehyde is prepared from the following types and amounts of materials:

| | Gm. |
|---|---|
| Beeswax | 200 |
| White mineral oil, U.S.P., viscosity 180 | 1,000 |
| Cholesterol, U.S.P. | 25 |
| Methylparaben, U.S.P. | 1 |
| n-Butyl-p-hydroxybenzoate | 9 |
| dl-Glyceraldehyde | 2,500 |
| Sodium bicarbonate | 100 |
| White petrolatum, U.S.P. q.s. | 5,000 |

The petrolatum and beeswax are melted together and the mineral oil added. The mixture is heated to 190° F. and the cholesterol added. After cooling to 170° F., the paraben and hydroxybenzoate are introduced. The resulting mixture is strained and cooled to between 130 and 135° F. The dl-glyceraldehyde and sodium bicarbonate are added and mixed in thoroughly with a high-speed mixer. The whole is then passed through a mill and mixed in a high-speed mixer until the product is congealed.

EXAMPLE 4.—CREAM

A cream containing 25% dl-glyceraldehyde is prepared in a 1,000-gm. lot from the following types and amounts of materials:

| Glyceryl monostearate (self-emulsifying) | gm. | 150 |
|---|---|---|
| Spermaceti, U.S.P. | gm. | 100 |
| Propylene glycol, U.S.P. | gm. | 50 |
| Polysorbate 80, U.S.P. | gm. | 5 |
| Methylparaben, U.S.P. | gm. | 1 |
| dl-Glyceraldehyde | gm. | 250 |
| Aqueous sodium hydroxide solution, 30% | ml. | 1 |
| Sodium citrate | gm. | 1.8 |
| Deionized water q.s. | gm. | 1,000 |

The glyceryl monostearate and spermaceti are melted together at a temperature of 70 to 80° C. The methylparaben is dissolved in about 500 gm. of water, and the propylene glycol, polysorbate 80, and dl-glyceraldehyde sodium hydroxide and sodium citrate are added in turn, maintaining a temperature of 75 to 80° C. The methylparaben mixture is added slowly to the glyceryl monostearate and spermaceti melt, with constant stirring. The addition is continued for at least 30 minutes with additional stirring until the temperature has dropped to 40 to 45° C. The pH of the final cream is adjusted to 7.5–8 by adding additional sodium hydroxide solution. Finally, sufficient water is added to bring the final weight to 1,000 gm. and the preparation is stirred until homogeneous.

EXAMPLE 5.—LOTION

Ten liters of a viscous lotion containing 5% dl-glyceraldehyde is prepared from the following types and amounts of materials:

| Propylene glycol, U.S.P. | gm. | 500 |
|---|---|---|
| Methylparaben, U.S.P. | gm. | 20 |
| n-Butyl-p-hydroxybenzoate | gm. | 30 |
| Polysorbate 80, U.S.P. | gm. | 200 |
| Glyceryl monostearate (self-emulsifying) | gm. | 800 |
| Spermaceti, U.S.P. | gm. | 350 |
| dl-Glyceraldehyde | gm. | 500 |
| Aqueous sodium hydroxide solution, 30% | ml. | 1 |
| Sodium citrate | gm. | 1.8 |
| Deionized water, q.s. | liters | 10 |

The methylparaben and n-butyl-p-hydroxybenzoate sodium hydroxide and sodium citrate are dissolved in 4.5 liters of deionized water and the solution heated to 70 to 80° C. To this solution are added the propylene glycol, polysorbate 80, glyceryl monostearate and spermaceti. The temperature of the mixture is maintained at 70 to 80° C. for 30 minutes and then allowed to cool to 35 to 45° C. The dl-glyceraldehyde is then introduced with vigorous mixing, pH adjusted to 7.5–8, water added to make 10 liters, and the resulting product strained and put through a homogenizer.

For the dl-glyceraldehyde of each of the foregoing Examples 1 through 5, inclusive, there can be substituted equal amounts of either the individual d- or l-isomer or mixtures thereof in other than equal amounts to provide equivalent compositions.

What is claimed is:

1. A method for darkening and rendering skin less permeable to ultra-voilet radiation comprising applying to non-inflamed skin glyceraldehyde in association with a pharmaceutically acceptable carrier having a pH greater than 7.

2. The method of claim 1 wherein the concentration of glyceraldehyde is from about 1 to about 50 percent of the said carrier.

3. The method of claim 1 wherein the pH of the pharmaceutically acceptable carrier is from about 7.5 to about 8.

4. The method of claim 1 wherein the pH of the pharmaceutically acceptable carrier is from about 7.5 to about 8 and the concentration of glyceraldehyde is from about 5 to about 25 percent of the said carrier.

References Cited

UNITED STATES PATENTS 3,162,576  12/1964  Glenn _____ 167—58

ALBERT T. MEYERS, *Primary Examiner.*

D. R. MAHANAND, *Assistant Examiner.*